Aug. 10, 1965  H. BLÄTTRY  3,199,880

MULTIPLE JAW CHUCK

Filed March 12, 1964  2 Sheets-Sheet 1

INVENTOR:
Hans Blättry,
BY
Everett A. Marmorek,
His Attorney.

United States Patent Office 3,199,880
Patented Aug. 10, 1965

3,199,880
MULTIPLE JAW CHUCK
Hans Blättry, Dusseldorf, North Rhine-Westphalia, Germany, assignor to Paul Forkardt K.G., Dusseldorf, Germany, a limited partnership of Germany
Filed Mar. 12, 1964, Ser. No. 351,348
Claims priority, application Germany, Mar. 20, 1963, F 39,289
6 Claims. (Cl. 279—121)

The invention relates to multiple jaw chucks, for use with lathes or other machine tools, and relates more particularly to such chucks which are capable of quick-action opening and closing for rapidly clamping and releasing a work piece.

Multiple jaw chucks are known under the description "universal chucks" which have movable jaws that may in a simple and convenient manner be adjusted. These universal chucks, however, generally are made only for manual adjustment at relatively low adjusting speed.

Power chucks are known, on the other hand, which are known as "production chucks" and usually are used for mass production, and provide for rapid power-adjustment of the jaws. The adjustment of the jaws is, however, only through small distances; these production chucks hence are used only for work pieces which all have about the same dimension. Where it is necessary to switch from workpieces of one size to those of another, the jaws must be unlocked from their position and be moved to their new position and subsequently be locked in their new position. This is cumbersome and time-consuming.

It is accordingly among the principal objects of the invention to provide a multiple jaw chuck that unites the advantages of the powered production chuck with those of the manually adjustable universal chuck.

It is a further object of the invention to provide a multiple jaw chuck that includes quick-action means for fast short distance adjustment of the jaws, and also means for superposing thereon a manual large distance jaw adjustment.

It is still another object of the invention to provide a multiple jaw chuck that has primary jaws and secondary jaws, the secondary jaws being carried by the primary jaws, all the primary jaws together with the secondary jaws being simultaneously power-adjustable, and all the secondary jaws being simultaneously adjustable manually in addition to the aforesaid power-adjustment.

It is yet a further object of the invention to provide such a multiple jaw chuck that has registering means for compensating any irregularities caused by play in positioning of the secondary jaws during the manual adjustment thereof.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, one embodiment of the same being illustrated in the accompanying drawings and described in the specification.

For a fuller understanding of the nature and objects of the invention, reference should be had to the following detailed description, taken in connection with the accompanying drawings, in which.

Figure 1:
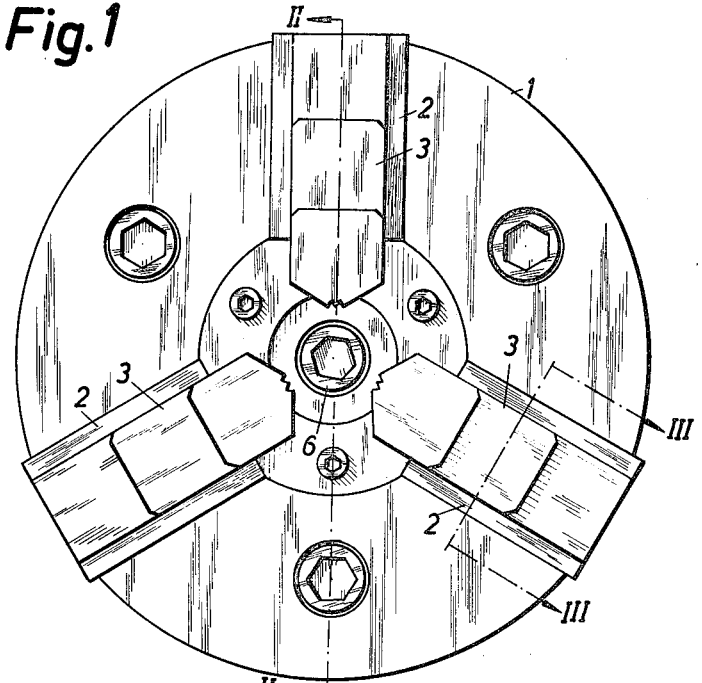
FIG. 1 is a front elevational view of a multiple jaw chuck in accordance with the invention.
Figure 2:
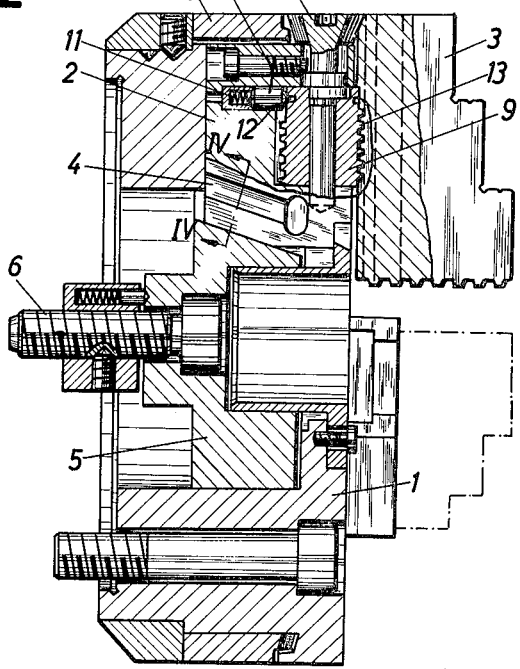
FIG. 2 is a sectional view, partly in elevation, taken on the line II—II of FIG. 1.
Figure 4:
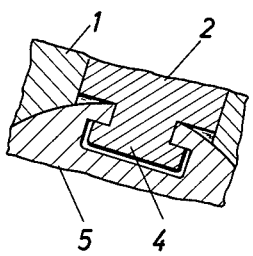
FIG. 4 is a fragmentary sectional view taken on the line IV—IV of FIG. 2.

In carrying the invention into effect in one of the embodiments which has been selected for illustration in the accompanying drawings and for description in this specification, and referring now particularly to FIGS. 1 and 2, there is provided a multiple jaw chuck that has a body 1 to be mounted on a machine tool for rotation about its center axis. The body 1 comprises a plurality, for instance three, main jaws or primary jaws 2, which are movable relative to the body 1 radially inwardly and outwardly. The main jaws 2 are moved by means of a quick-action mechanism that includes wedges 4, a piston 5 and a rod 6. When the rod 6 is pulled rearwardly of the body 1 (to the left in FIG. 2), for instance in response to the action of power means (not shown), the wedges 4 will cause the main jaws 2 to move radially inwardly throughout a small distance, for engaging the workpiece in the center of the chuck. When, on the other hand, the rod 6 is moved in the opposite direction (to the right in FIG. 2), the main jaws 2 will be moved outwardly for the aforesaid small distance, to release the workpiece. The wedge action for drawing together and, respectively, moving apart the main jaws 2, in response to the linear movement parallel of the center axis of the body 1 by the rod 6 and the piston 5, is best shown in FIGS. 2 and 4.

In each main jaw 2 there is journalled about a radial axis a drive member, such as a threaded spindle 9 which carries near its outer end a driven member such as a pinion 8. As best shown in FIG. 2, the pinion 8 may be bevelled.

A secondary jaw 3 is guided on each main jaw 2, and carries a thread that meshes with the thread 13 of the spindle 9.

Figure 3:
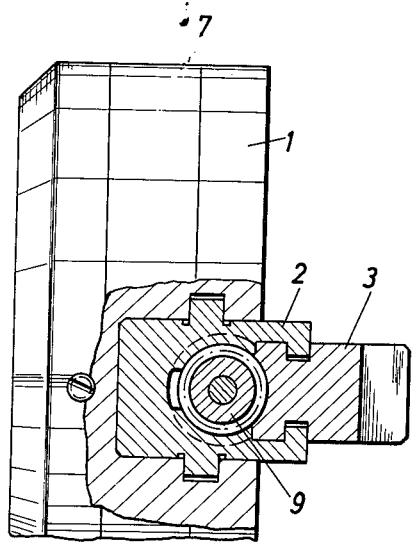
FIG. 3 is a fragmentary elevational view, partly in section taken on the line III—III of FIG. 1.

The threads of the spindle 9 and of the secondary jaw 2 are so arranged that turning of the spindle 9 in one direction (for instance clockwise in FIG. 3) will cause a radial movement of the secondary jaw 3 (for instance towards the center of the body 1); conversely turning of the spindle 9 in the opposite direction will move the jaw 3 radially in the opposite direction (for instance outwardly from the center of the body 1).

In the body 1 there is journalled near its periphery a drive actuator such as an annular gear 7, that may be a bevelled gear. The gear 7 is in mesh with all the pinions 8, and is movable peripherally on the body 1. Thus, turning of one pinion 8 will cause rotation of the gear 7 and thereby will cause turning also of all the other pinions 8. Each pinion 8 may have means, such as for instance a socket to be engaged by a wrench, for turning of the pinion 8 by hand.

The operation of the multiple jaw chuck, as described above, is as follows.

When a new work piece is to be inserted, the operator will first make a manual adjustment of the secondary jaws 3. For this adjustment the operator will turn one of the pinions 8. The pinion 8 will cause rotation of the gear 7, which will cause rotation of the other pinions 8. By this movement, the secondary jaws 3 will be moved radially. The operator will continue this until the secondary jaws 3 have been positioned sufficiently close to the width of the work piece, so that a subsequent actuation of the quick-action mechanism will draw the main jaws 2 and therewith the secondary jaws 3 centerwards to engage the workpiece.

Thus each spindle 9 forms a drive member, and each pinion 8 forms a driven member that is in driven connection with the spindle 9.

After this adjustment, the chuck is ready. To engage the workpieces, the operator will actuate the quick-action mechanism, which will cause movement (to the left, FIG. 2) of the rod 6 and of the piston 5 to draw the main jaws 2 together. As each secondary jaw 3 is connected by means of the spindle 9 to the main jaw 2, the secondary jaws 3 will be moved with the main jaws 2 and will engage the work piece.

Subsequent opposite movement of the rod 6 and the piston 5, on the other hand (to the right, FIG. 2) will release the work piece.

Thus, the principal adjustment of the jaws to the dimensions of the work piece is made manually by the adjustment of the secondary jaws 3 with the aid of the spindles 9 as turned by the pinions 8; while the actual engagement of the work piece by the secondary jaws 3 is accomplished by the quick-acting mechanism which moves the main jaws 2 and thereby the secondary jaws 3 throughout but a small radial distance.

The gear 7 is journalled in the body 1; each pinion 8, however, although it meshes with the gear 7, moves radially with the main jaw 2. This results in a small though definite play, and this play may cause a sizable inaccuracy in the positioning of the secondary jaws 3. To compensate for these inaccuracies, each main jaw 2 carries a spring powered tapered registering pin 10 that is movable parallel of the center axis of the body 1, and is biased by the spring 11 into a forward position (to the right, FIG. 2). In the forward position the pin 10 engages a conical bore 12 that is formed in the periphery of the spindle 9. In fact, each spindle 9 may have several such bores 12 for engagement by the pin 10. Thus, after each full revolution of each spindle 9, the pin 10 will engage the respective bore 12, thereby assuring after each spindle turn the exact same positioning of the spindle and hence of the secondary jaw 3.

Where each spindle has several bores 12, such registering with the pin 10 will occur after each respective fraction of a full spindle revolution.

If the biasing spring 11 is made sufficiently powerful, the registering of the pins 10 in the spindles 9 may be heard and felt as a distinct click; thus, the operator will wait until he has heard all three clicks before he will initiate the quick-action mechanism.

When the pins 10 engage the bores 12 of the spindles 9, they sometimes, in adjusting for inaccuracies, will cause turning for a fraction of a turn of the spindle 9, prior to the resting in the bore 12. As this registering is carried out before the quick-action mechanism has been powered, the pins 10 are not obliged to overcome any great resistance.

The secondary jaws 3 may be turned around for 180°.

In order to insert the secondary jaws 3 in succession, the invention provides for off-setting in the spindles 9 of the aforesaid conical bores 12 at the beginning of the spindle thread 13 for a fraction that corresponds to the amount of secondary jaws 3 used; thus, for a three-jaws chuck, the off-setting will be 120°.

The same purpose, namely to insert the secondary jaws in succession, in accordance with another embodiment of the invention, may instead be achieved by making the spindles 9 of different lengths, differing for one-half, or for one or for several pitches of the thread 13.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In a multiple jaw chuck, having a round body and a quick-action mechanism, the combination of a plurality of radially movable main jaws adapted to be adjusted radially simultaneously by said mechanism relative to said body, each main jaw comprising a drive member and a driven member in driving connection therewith, a secondary jaw connected to each main jaw and being radially movable therewith and being also radially movable relative thereto substantially throughout the radial extent of the body, and being in driven connection with said drive member and thereby movable relative to said main jaw, a drive actuator mounted on said body and engaging all of said driven members, whereby the operation of the drive member of one main jaw will result in the simultaneous operation of the drive members of all the main jaws and thereby in the simultaneous radial movement of all the secondary jaws relative to the main jaws, said quick-action mechanism acting on said main jaws independently of said drive members.

2. In a multiple jaw chuck, having a round body and a quick-action mechanism, the combination of a plurality of radially movable main jaws adapted to be adjusted radially simultaneously by said mechanism relative to said body, each main jaw comprising a radially journalled spindle and a pinion connected thereto, a secondary jaw connected to each main jaw and being radially movable therewith and being also radially movable relative thereto substantially throughout the radial extent of said body, and being in driven connection with said spindle for the movement relative to said main jaw, a gear mounted on said body and being in mesh with all of the pinions, whereby turning of one spindle will result in the simultaneous turning of all the spindles and thereby in the simultaneous radial movement of all the secondary jaws relative to the main jaws, said quick-action mechanism acting on said main jaws independently of said spindles.

3. In a multiple jaw chuck, as claimed in claim 2, said pinions being bevelled, said gear being a bevel gear engaging all of said pinions.

4. In a multiple jaw chuck, as claimed in claim 2, each main jaw comprising a spring pressed movable registering pin, said spindle comprising a thread and having a recess for receiving said registering pin, the recesses of the spindles being off-set relative to the start of the thread of the spindles.

5. In a multiple jaw chuck, as claimed in claim 2, said spindles being threaded and differing in length from each other for differences ranging from one-half pitch to several pitches of said thread.

6. In a multiple jaw chuck, as claimed in claim 2, each secondary jaw comprising a threaded groove extending throughout the length of the secondary jaw, the thread thereof engaging the spindle of the respective main jaw, said groove being so positioned and dimensioned relative to said pinion as to clear the pinion during movement of said secondary jaw.

References Cited by the Examiner

UNITED STATES PATENTS

| | | | |
|---|---|---|---|
| 1,628,476 | 5/27 | Sloan | 279—123 |
| 1,908,777 | 5/33 | Mehren | 279—119 |
| 3,089,708 | 5/63 | Long | 279—123 |

ROBERT C. RIORDON, *Primary Examiner.*